J. S. CURRIER.
TORPEDO.
APPLICATION FILED AUG. 10, 1920.

1,394,284.

Patented Oct. 18, 1921.
3 SHEETS—SHEET 2.

Inventor
J. S. Currier

By
Attorney

J. S. CURRIER.
TORPEDO.
APPLICATION FILED AUG. 10, 1920.
1,394,284.
Patented Oct. 18, 1921.
3 SHEETS—SHEET 3.
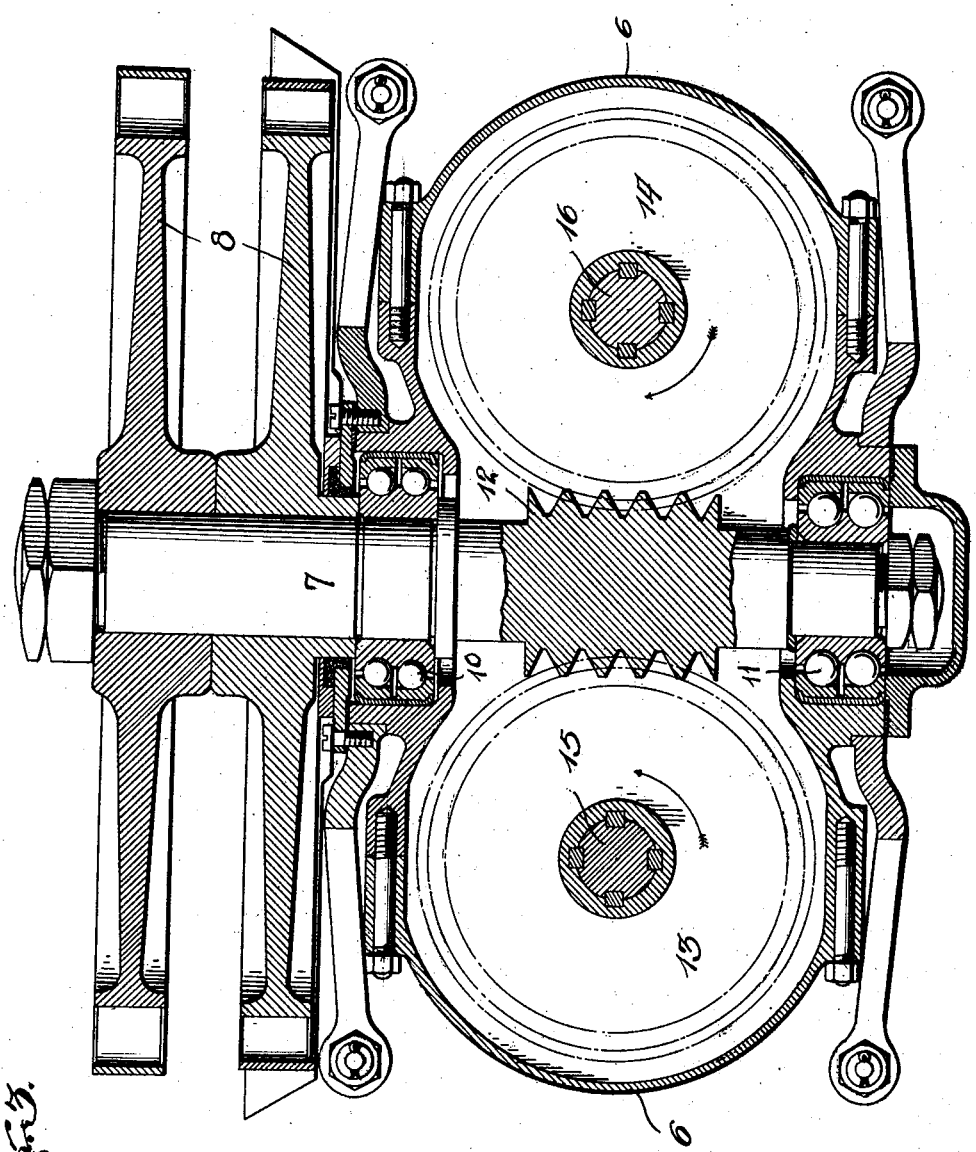
Inventor
J. S. Currier
Attorney

UNITED STATES PATENT OFFICE.

JAMES S. CURRIER, OF NEWPORT, RHODE ISLAND, ASSIGNOR TO THE GOVERNMENT OF THE UNITED STATES.

TORPEDO.

1,394,284.  Specification of Letters Patent.  Patented Oct. 18, 1921.

Application filed August 10, 1920. Serial No. 402,686.

*To all whom it may concern:*

Be it known that I, JAMES S. CURRIER, a citizen of the United States, residing at Newport, Rhode Island, have invented new and useful Improvements in Torpedoes, of which the following is a specification.

This invention relates to improvements in torpedoes and more particularly to improvements in the motive means and driving transmission whereby the torpedo is propelled through the water.

One of the objects of the present invention is to improve and simplify the driving means of a torpedo whereby the same may be easily assembled and constructed.

A further object is to provide an improved transmission mechanism having relatively fewer parts which may be more inexpensively manufactured.

A further object is to provide a drive mechanism for torpedoes which will be more reliable and efficient in use and operation and in which friction between relatively moving parts is eliminated as much as possible.

A further object is to provide a drive mechanism for torpedoes adapted to eliminate the excessive use of oil and the heretofore objection to a smoky exhaust from the engine.

Other objects will be in part obvious and in part hereinafter pointed out.

In the accompanying drawings wherein is shown one of various possible embodiments of the present invention, Figure 1 is a vertical longitudinal sectional view of such parts of the mechanism as is necessary to understand the invention.

Fig. 3 is a vertical transverse sectional view taken substantially on the line 3/3, Fig. 1.

Figure 1:
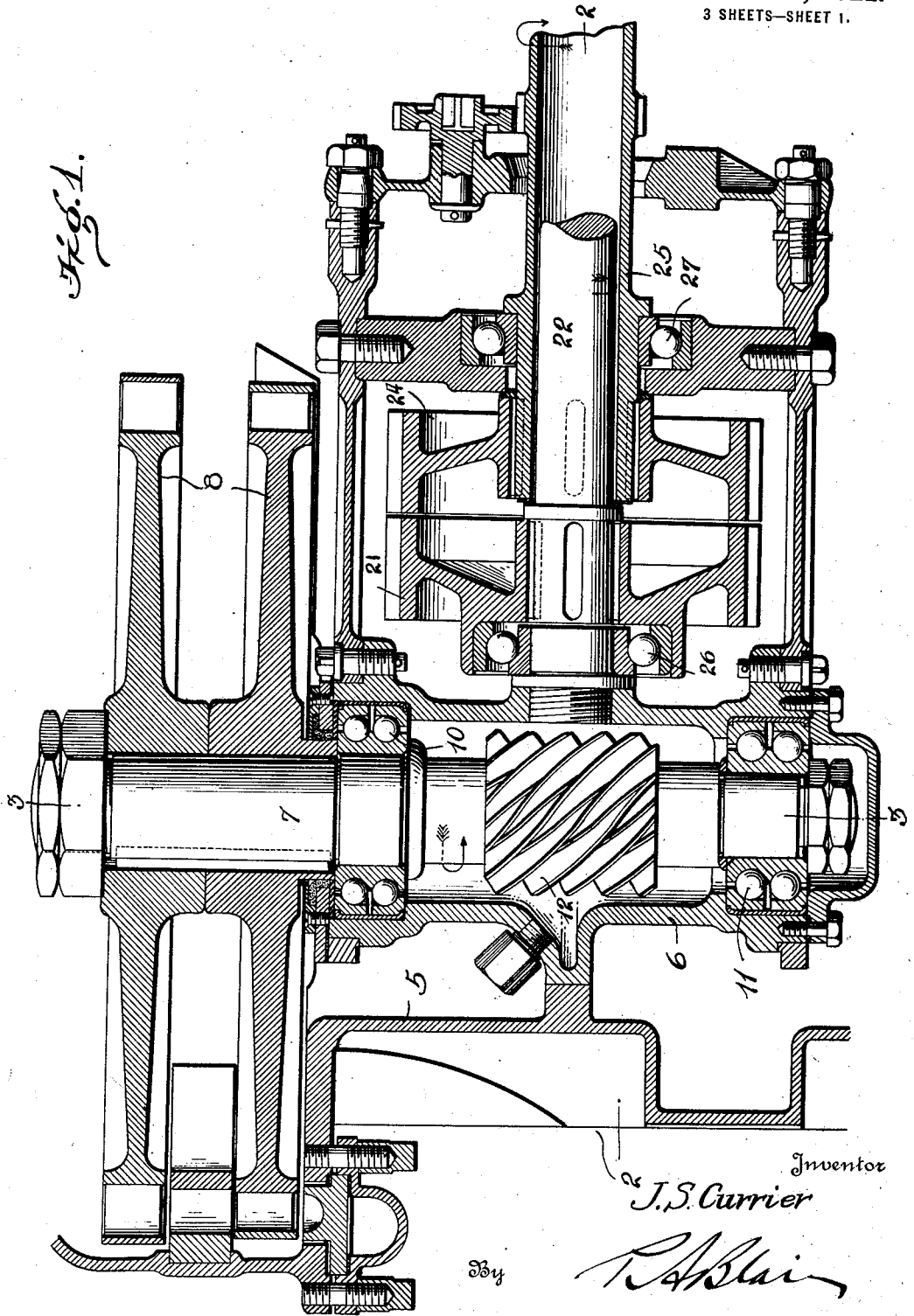

Referring now to the drawings in detail, 5 indicates a portion of the engine supporting frame with which is associated an oil tight casing 6 having a vertically and centrally disposed shaft 7 carrying at its upper part or end turbine wheels 8 adapted to be driven in the same direction by usual fluid means and in a manner well-known to those familiar with the art. This shaft 7 is provided with suitable bearings 10 and 11 at its central and lower parts respectively whereby the turbines will be rotated with a minimum amount of friction. Between these bearings is a worm gear 12 adapted to mesh with two pinions 13 and 14 respectively as shown more clearly in Figs. 2 and 3. These pinions and worm are all housed within the casing 6 which is preferably filled with oil in order that the parts may be thoroughly and well lubricated. The gears or pinions 13 and 14 are mounted upon relatively short shafts 15 and 16 respectively the ends of which shafts are mounted in bearings 18 as shown, the bearings being of such construction as to take up lateral as well as longitudinal movements. The shaft 15 is provided with a gear or pinion 20 meshing with a larger gear 21 carried by a shaft 22 while the shaft 16 is provided with a similar gear 23 meshing with gear 24 keyed to sleeve 25 surrounding the shaft 22. This shaft and sleeve extend rearwardly through the after-body of the torpedo and each carries a propeller for driving the torpedo, these propellers being centrally disposed and rotating in opposite directions thereby to prevent any deflection in the course of the torpedo as might be produced if they rotate in the same direction.

Figure 2:
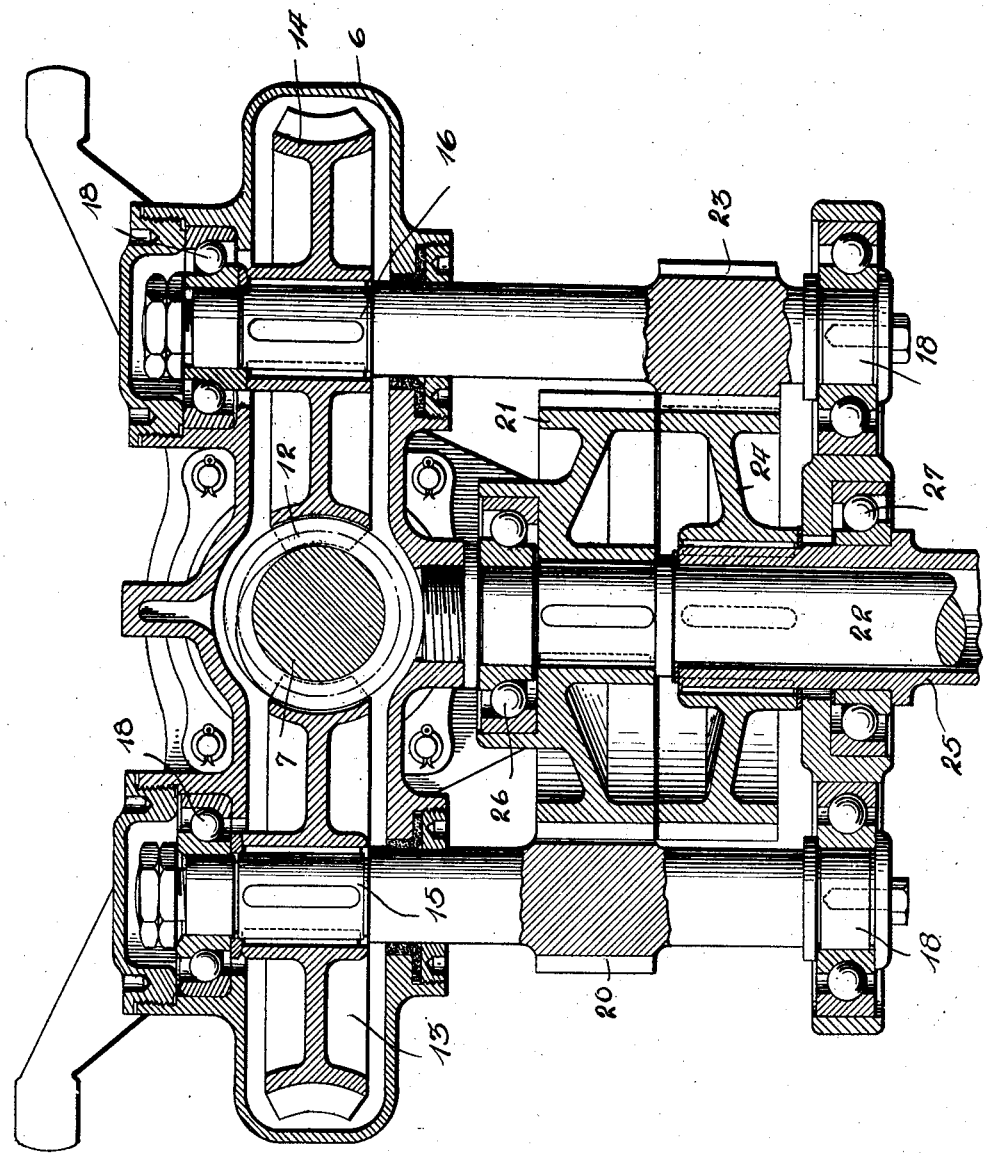
Fig. 2 is a horizontal plan view taken on substantially the line 2/2, Fig. 1.

It will be noted by reference to Figs. 1 and 2 that the shaft 22 is mounted in thrust bearings 26 while the sleeve 25 is mounted in thrust bearings 27, the bearings being so positioned and arranged as to prevent any relative longitudinal movement from occurring between the shaft 22 and the sleeve 25.

It will be noted from reference to Fig. 1 that the heretofore objectionable construction of concentric sleeve and shaft for the two turbines is eliminated. This construction not only involved a reduction in efficiency by reason of loss due to friction but the rapidly relative and oppositely rotating parts cause the oil to creep upwardly to the turbines and be thrown out laterally where it came in contact with the hot gases impinging upon the blades of the turbine. The oil was then burned or vaporized and passed out in the form of smoke with the exhaust gases making a visible wake to the path of the torpedo. By having a single shaft running in oil and suitably packed by gaskets, packing rings, etc., a leakage from the casing 6 is prevented.

It is believed to be unnecessary to go into all the details of assembling which will be clear to those skilled in the art from the annexed sheets of drawing. The operation will also, it is believed, be obvious and it is sufficient to state that the motive fluid impinging upon the blades of the turbine 8 will rotate the shaft 7 and through the worm 12 drive the shafts 15 and 16 which in turn transmit their power through the interposed gearing to the concentric shaft and sleeve 22 and 25. The construction is simple, practical, reliable and efficient, may be easily manufactured and assembled and is particularly designed to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should be and are intended to be comprehended within the meaning and range of equivalency of the following claims.

What I claim is:—

1. In a torpedo, in combination, a shaft, a pair of turbine wheels mounted upon said shaft, a worm associated with said shaft, pinions meshing with said worm and a propeller supporting means driven by said pinions.

2. In a torpedo, in combination, a shaft, a pair of turbines mounted upon said shaft, a pair of concentrically disposed propeller supporting means and gearing between said means and said shaft whereby said means are driven in opposite directions, said intervening means comprising worm and pinion connections.

3. In a torpedo, in combination, a shaft, means for rotating said shaft, a worm carried by said shaft, pinions meshing with said worm and propeller carrying means adapted to be rotated by said pinions, said propeller carrying means comprising a shaft and sleeve adapted to rotate in opposite directions and gearing connected therewith driven from said pinions.

4. In a torpedo, in combination, a shaft, means for driving said shaft, roller bearings for supporting said shaft, a pair of shafts arranged at each side and at right angles to said shaft, a pinion on each of said second shafts, a worm on the first shaft with which said pinions mesh and propeller carrying means driven from said second mentioned shafts.

5. In a torpedo, in combination, a shaft, means for driving said shaft, a worm on said shaft, a pair of shafts adjacent said first mentioned shaft and having their axes at right angles thereto and power transmitting means between said first shaft and the second shafts and a casing inclosing said power transmitting means.

6. In a torpedo, in combination, a shaft, means for driving said shaft, a worm on said shaft, a pair of shafts adjacent said first mentioned shaft and having their axes at right angles thereto and power transmitting means between said first shaft and the second shafts, said shaft being supported in roller bearings.

7. In a torpedo, in combination, a shaft, means for driving said shaft, a worm on said shaft, a pair of shafts adjacent said first mentioned shaft and having their axes at right angles thereto and power transmitting means between said first shaft and the second shafts, said shaft being supported in roller bearings and a casing inclosing the power transmitting means.

8. In a torpedo, in combination, a supporting frame, a shaft mounted therein, means whereby said shaft may be rotated, a worm on said shaft, pinions meshing with said worm and a casing inclosing said worm and pinions whereby they may run in an oil bath, shafts supporting said pinions, propeller supporting means, including a shaft and concentric sleeve and gearing between said second mentioned shafts and said propeller supporting means.

Signed at Newport, Rhode Island, this 13 day of March, 1920.

JAMES S. CURRIER.